UNITED STATES PATENT OFFICE.

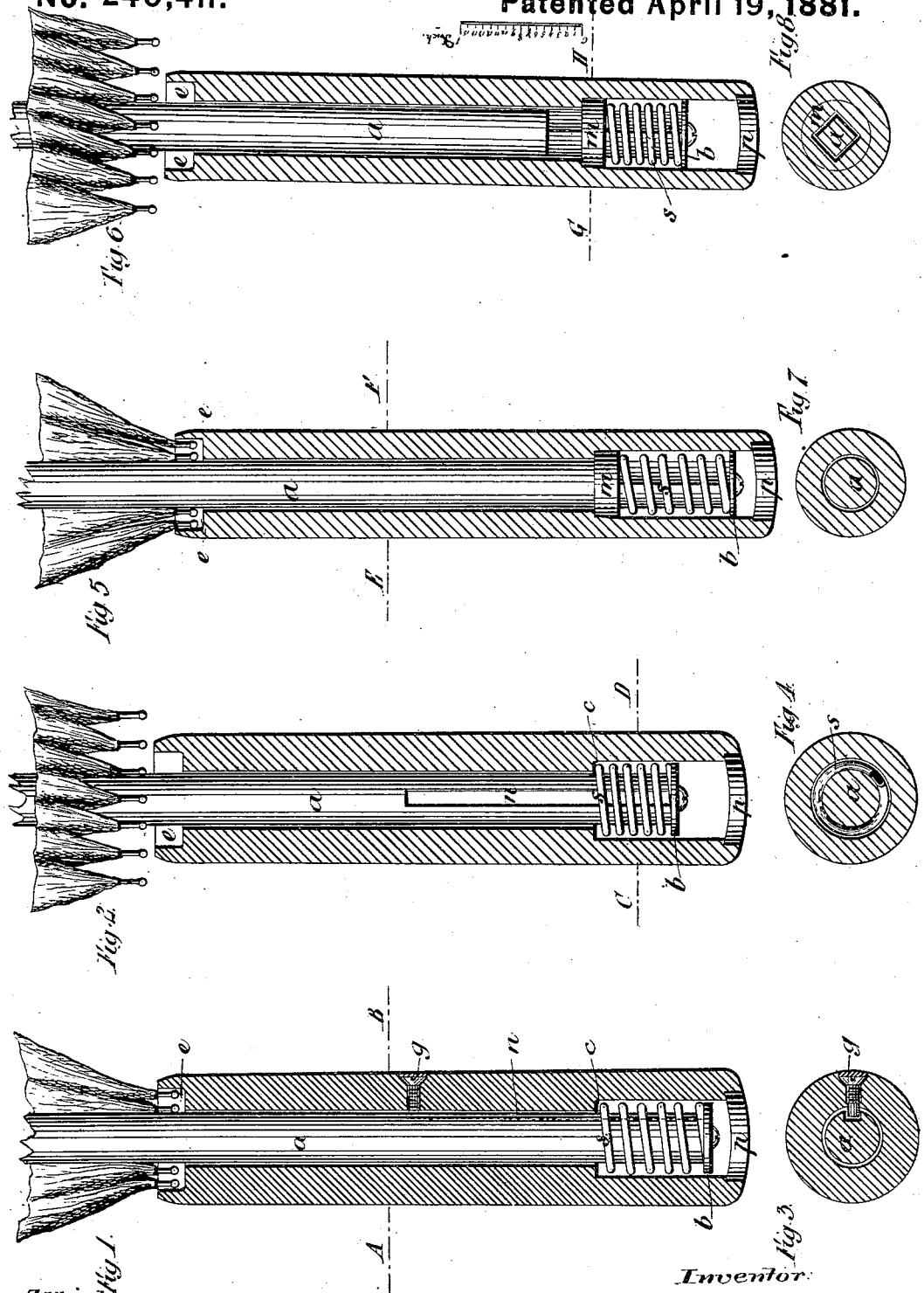

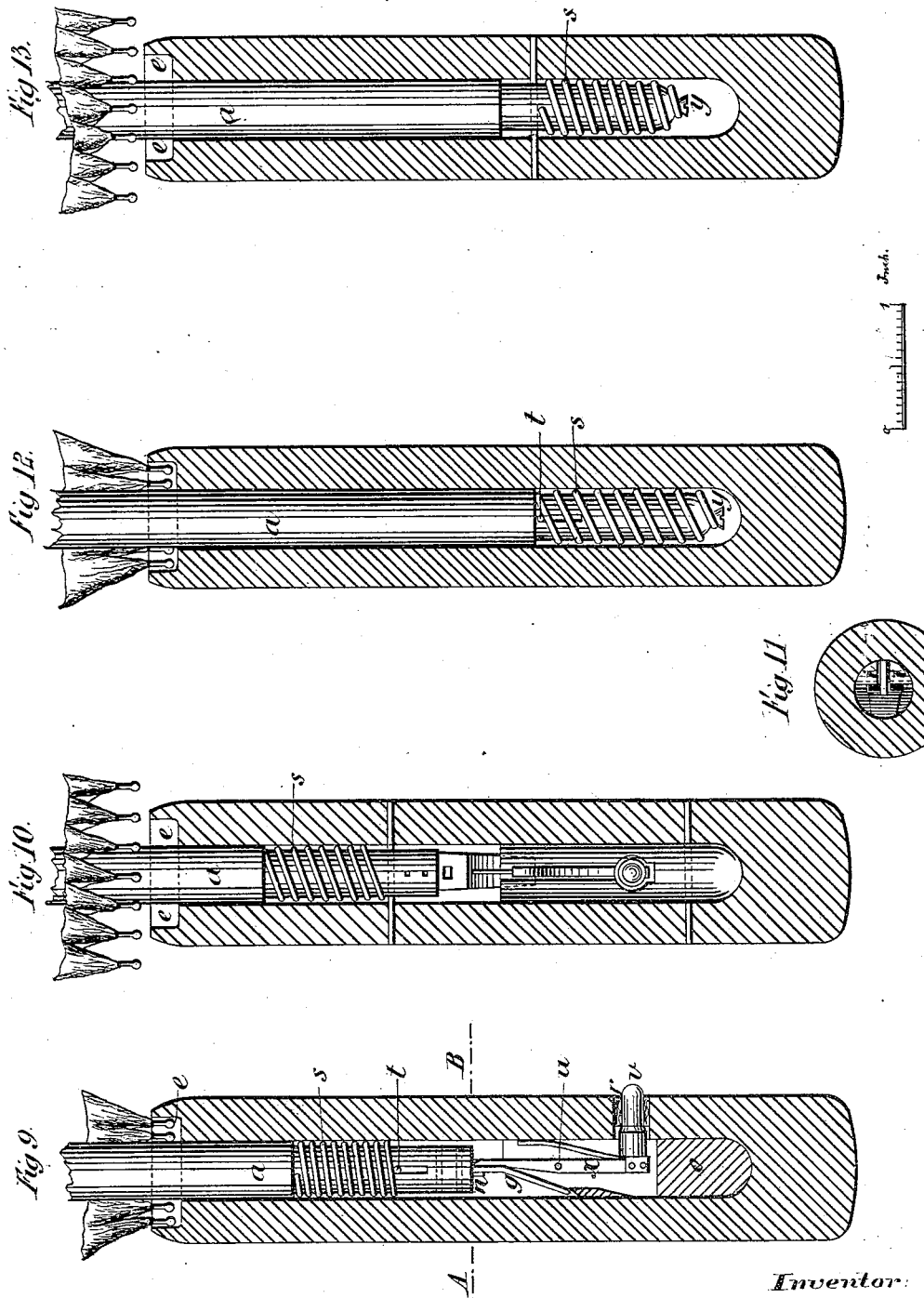

FRIEDRICH C. P. HARTMANN, OF BERLIN, PRUSSIA, GERMANY, ASSIGNOR OF ONE-HALF TO JOACHIM FRIEDRICH WILHELM JAEDICKE AND EMANUEL LUDWIG GEORG GOLDSCHMIDT, OF SAME PLACE.

UMBRELLA.

SPECIFICATION forming part of Letters Patent No. 240,411, dated April 19, 1881.

Application filed December 9, 1880. (No model.)

*To all whom it may concern:*

Be it known that I, FRIEDRICH CARL PETER HARTMANN, of the city of Berlin, Prussia, Germany, have invented new and useful Improvements in Frames of Umbrellas, of which the following is a specification, reference being had to the accompanying drawings.

This invention relates to improvements in that class of umbrellas and parasols in which the tips of the ribs are confined in place when the umbrella or parasol is closed by means of a sliding cap.

The object of the present invention is to provide a handle for the ordinary stick of an umbrella, which handle is incapable of rotation on the stick, but is adapted to slide longitudinally on the same to retain or release the tips, by which construction an inexpensive, neat, and attractive umbrella is provided.

In all the constructions hereinafter specified the handle, into which the stick of the umbrella penetrates, is perforated lengthwise, and the rotation of the stick is prevented by suitable means. In the form shown in Figure 1 the rotation is prevented by a screw-pin, $g$, which enters a groove, $n$, upon the stick. In the form illustrated in Fig. 5 the rotation is prevented by making the end of the stick square and passing the same through a disk, $m$, fixed in the interior of the handle. In the construction represented in Figs. 9 and 12 the rotation is prevented by a pin passing through a slot in the stick.

The manipulation for gathering the ribs is illustrated in Figs. 2 and 6, while Figs. 1 and 5 show the same gathered and held by the handle.

Fig. 3 is a section on the line A B, Fig. 1. Fig. 4 is a section on the line C D, Fig. 2. Fig. 7 is a section on the line E F, Fig. 5, and Fig. 8 a section on the line G H, Fig. 6; and these figures illustrate details of construction hereinafter fully specified.

The handle of an umbrella embodying my invention is perforated lengthwise, and the stick $a$ enters the same. The upper end of the perforation is somewhat widened for the reception of a coiled spring, $s$. In Figs. 1 and 2 this coiled spring $s$ is shown as bearing against a disk, $b$, screwed upon the stick $a$, and against the shoulder in the handle $c$, formed by the aforesaid widening of the perforation. The other end of the handle is turned out at $e$ for the reception of the ends of the umbrella-ribs.

To prevent rotation of the umbrella-stick, a screw or pin, $g$, is let into the handle. Said screw projects into a groove, $n$, in the stick hereinbefore mentioned, and thus prevents its rotation.

The manipulation will be easily understood by reference to the figures. If it be desired to close the umbrella the handle is, by being pulled, brought into the position shown in Fig. 2, the wires are gathered, and the handle is allowed to rebound over the same by the action of the coiled spring $s$. The perforation in the handle is closed at its upper end by a plate, $p$, preferably conforming to the shape of the handle, and the pin or screw $g$ is also rendered invisible in any suitable manner. The modification of this arrangement (shown in Figs. 5, 6, 7, 8) refers principally to the manner in which rotation of the stick relatively to the handle can be obviated or prevented. The wide part of the perforation is, according to this part of my invention, closed at one end by a plate, $m$, which is fixed in any convenient manner. This plate has a quadrangular hole, and through this hole passes the end of the umbrella-stick, also made quadrangular. As in the first-described construction, the stick carries a plate at its end, and against this and the above-mentioned plate $m$ a coiled spring bears. The manipulation of this arrangement is the same as that of the former one.

The third construction, Figs. 9, 11, differs from the others in that the umbrella-ribs are held together in the recess $e$ when the spring is compressed, while in the arrangements above described this takes place by the expansion of the spring. The stick is guided by the pin $t$. When the stick is in its lowest position a two-armed lever, fulcrumed at $u$, takes into an opening, $n$, of a bent piece, $g$, preferably made of sheet metal and fixed at the end of the stick. The said lever has bearings $i$, Fig. 11, and is inserted, together with the latter, (which are made of wood and exactly fit into the opening $o$ in the handle,) and is fixed in the said handle. Against the free arm of the lever $x$ the stud $v$ presses, being loosely fitted into an aperture provided therefor, and it is prevented from falling out by a wooden ring, $r$, which is glued into the handle. If pressure be exerted on this stud the bent piece $g$, and consequently the umbrella-stick, are freed at $n$, and the spring $s$ drives the latter outward, thus allowing the umbrella to be opened.

Another modification, Figs. 12 and 13, is substantially analogous to the construction shown in Figs. 1 and 5; but there is the difference that the rotation of the umbrella-stick $a$ is, in this modification, prevented by a pin, $t$, passing through it, against which pin the spring $s$ bears, and the latter is attached directly to the stick by means of a screw, $y$.

What I claim is—

The combination, with the ordinary stick of an umbrella or parasol, and a handle constructed with a recess at one end to receive the tips, and having a longitudinal central bore inclosing the end of the stick, of a pin in the handle engaging with a slot in the stick, or equivalent devices for preventing the rotation of the handle on the stick, and a spiral spring contained within the handle and encircling the end of the stick, all substantially as and for the purposes described.

This specification signed by me this 26th day of August, 1880.

FRIEDRICH CARL PETER HARTMANN.

Witnesses:
FRANZ SCHULTZE,
BERTHOLD ROI.